US012769665B2

(12) United States Patent
Isaac-Chassande et al.

(10) Patent No.: US 12,769,665 B2
(45) Date of Patent: Oct. 20, 2026

(54) COMPUTING DEVICE WITH CACHE MEMORY OPTIMIZED FOR MATRIX COMPUTING

(71) Applicant: Commissariat à l'Energie Atomique et aux Energies Alternatives, Paris (FR)

(72) Inventors: Valentin Isaac-Chassande, Grenoble (FR); Adrian Evans, Grenoble (FR); Yves Durand, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 19/204,516

(22) Filed: May 10, 2025

(65) Prior Publication Data

US 2025/0355810 A1 Nov. 20, 2025

(30) Foreign Application Priority Data

May 17, 2024 (FR) ................................. FR2405054

(51) Int. Cl.
*G06F 12/0864* (2016.01)
*G06F 12/0846* (2016.01)

(52) U.S. Cl.
CPC ...... *G06F 12/0864* (2013.01); *G06F 12/0848* (2013.01); *G06F 2212/6032* (2013.04)

(58) Field of Classification Search
CPC ......... G06F 12/0864; G06F 2212/6032; G06F 12/0848; G06F 2212/1016;
(Continued)

(56) References Cited

U.S. PATENT DOCUMENTS 5,367,653 A * 11/1994 Coyle ................. G06F 12/0864 711/128
11,494,313 B2 * 11/2022 Kim .................... G06F 12/0246
(Continued)

OTHER PUBLICATIONS

Pal, Subhankar, Jonathan Beaumont, Dong-Hyeon Park, Aporva Amarnath, Siying Feng, Chaitali Chakrabarti, Hun-Seok Kim, David Blaauw, Trevor Mudge, and Ronald Dreslinski. "Outerspace: An outer product based sparse matrix multiplication accelerator." In 2018 IEEE International Symposium on High Performance Computer Architecture (HPCA), pp. 724-736. IEEE, 2018.
(Continued)

*Primary Examiner* — Hosain T Alam
*Assistant Examiner* — Zubair Ahmed
(74) *Attorney, Agent, or Firm* — Jordan IP Law, LLC

(57) ABSTRACT

The present description concerns a computing device comprising a computing unit; a main memory; a cache memory configured to exchange data with the computing unit and the main memory, and comprising a circuit for calculating reduction operations between partial products derived from values of a sparse matrix and an input vector, and an output vector, wherein the cache memory comprises a first N-way set associative memory region storing, with a first word granularity $T_D$, values of results of reduction operations performed by the computing circuit based on partial products derived from values of a dense region of the matrix, and a second fully associative or M-way set associative memory region storing, with a second word granularity $T_S$, values of results of reduction operations performed by the computing circuit based on partial products derived from values of a sparse region of the matrix, with M≥N, $T_D \geq T_S$, and also M>N if $T_D = T_S$ and $T_D > T_S$ if M=N.

15 Claims, 5 Drawing Sheets

(58) Field of Classification Search
CPC ....... G06F 2212/1044; G06F 2212/454; G06F 2212/601; G06F 17/16
USPC .................................................. 711/128, 118
See application file for complete search history.

(56) References Cited

U.S. PATENT DOCUMENTS

| | | | | |
|---|---|---|---|---|
| 2006/0020756 | A1 | 1/2006 | Tran et al. | |
| 2012/0096295 | A1 * | 4/2012 | Krick | G06F 1/3275 713/324 |
| 2018/0189239 | A1 | 7/2018 | Nurvitadhi et al. | |

OTHER PUBLICATIONS

Mukkara, Anurag, Nathan Beckmann, and Daniel Sanchez. "PHI: Architectural support for synchronization-and bandwidth-efficient commutative scatter updates." In Proceedings of the 52nd Annual IEEE/ACM International Symposium on Microarchitecture, pp. 1009-1022. 2019.

Tran, Le-Nguyen, Fadi J. Kurdahi, Ahmed M. Eltawil, and Houman Homayoun. "Heterogeneous memory management for 3D-DRAM and external DRAM with QoS." In 2013 18th Asia and South Pacific Design Automation Conference (ASP-DAC), pp. 663-668. IEEE, 2013.

Zhu, Gangyi, and Gagan Agrawal. "A performance prediction framework for irregular applications." In 2018 IEEE 25th International Conference on High Performance Computing (HiPC), pp. 304-313. IEEE, 2018.

Srikanth, Sriseshan, Anirudh Jain, Thomas M. Conte, Erik P. Debenedictis, and Jeanine Cook. "SortCache: Intelligent cache management for accelerating sparse data workloads." ACM Transactions on Architecture and Code Optimization (TACO) 18, No. 4 (2021): 1-24.

French Search Report for French Application No. FR2405054; mailed on Dec. 9, 2024; 2 pages.

Isaac-Chassande, Valentin, Adrian Evans, Yves Durand, and Frederic Rousseau. "Dedicated hardware accelerators for processing of sparse matrices and vectors: A survey." ACM Transactions on Architecture and Code Optimization 21, No. 2 (2024): 1-26.

* cited by examiner

| set | tag | state | val | val | tag | state | val | val |
|---|---|---|---|---|---|---|---|---|
| 0 | | NOV | – | – | 0x2 | VNU | 4 | 0 |
| 1 | 0x0 | VUP | 1 | 2 | 0x4 | VIP | 3 | 9 |

a)

RED 0x18 5
Hit (VUP→VUP)

| | | | | | | | | |
|---|---|---|---|---|---|---|---|---|
| 0 | | NOV | – | – | 0x2 | VNU | 4 | 0 |
| 1 | 0x0 | VUP | 1 | 7 | 0x4 | VIP | 3 | 9 |

b)

RED 0x90 3
Hit (VIP→VIP)

| | | | | | | | | |
|---|---|---|---|---|---|---|---|---|
| 0 | | NOV | – | – | 0x2 | VNU | 4 | 0 |
| 1 | 0x0 | VUP | 1 | 7 | 0x4 | VIP | 6 | 9 |

c)

RED 0x28 2
Miss (NOV→VNU)

| | | | | | | | | |
|---|---|---|---|---|---|---|---|---|
| 0 | 0x1 | VNU | 0 | 2 | 0x2 | VNU | 4 | 0 |
| 1 | 0x0 | VUP | 1 | 7 | 0x4 | VIP | 6 | 9 |

d)

RED 0xd0 3
Miss (VUP→VNU Evict)

| | | | | | | | | |
|---|---|---|---|---|---|---|---|---|
| 0 | 0x1 | VNU | 0 | 2 | 0x2 | VNU | 4 | 0 |
| 1 | 0x6 | VNU | 3 | 0 | 0x4 | VIP | 6 | 9 |

WRITE 0x10 (1 7)

e)

RED 0xa0 1
Miss (VNU→VNU Evict RMWs)

| | | | | | | | | |
|---|---|---|---|---|---|---|---|---|
| 0 | 0x1 | VNU | 0 | 2 | 0x5 | VNU | 1 | 0 |
| 1 | 0x6 | VNU | 3 | 0 | 0x4 | VIP | 6 | 9 |

RMW 0x40 4 f)

RED 0x38 5
Miss (VIP→VNU Evict)

| | | | | | | | | |
|---|---|---|---|---|---|---|---|---|
| 0 | 0x1 | VNU | 0 | 2 | 0x5 | VNU | 1 | 0 |
| 1 | 0x6 | VNU | 3 | 0 | 0x1 | VNU | 0 | 5 |

g)

RED 0x20 4
Hit (VNU→VNU)

| | | | | | | | | |
|---|---|---|---|---|---|---|---|---|
| 0 | 0x1 | VNU | 4 | 2 | 0x5 | VNU | 1 | 0 |
| 1 | 0x6 | VNU | 3 | 0 | 0x1 | VNU | 0 | 5 |

h)

RED 0xe8 7
Miss (VNU→VNU Evict)

| | | | | | | | | |
|---|---|---|---|---|---|---|---|---|
| 0 | 0x7 | VNU | 0 | 7 | 0x5 | VNU | 1 | 0 |
| 1 | 0x6 | VNU | 3 | 0 | 0x1 | VNU | 0 | 5 |

i)

FIG. 3

COMPUTING DEVICE WITH CACHE MEMORY OPTIMIZED FOR MATRIX COMPUTING

FIELD

The present disclosure generally concerns the field of computing devices, or calculators, used in particular for the implementation of matrix computing operations.

BACKGROUND

Many high-performance computing (HPC) applications involve matrix computing operations, such as for example the solving of partial differential equation systems or of semantic graphs. It is frequent for matrices used in these computing operations to correspond to hollow matrices, also known as sparse matrices, comprising a large number of null values, or zeros, with respect to the total number of values. These computing operations may in particular involve the execution of algorithms of multiplication of a sparse matrix A with a vector b (an operation known as "SpMV"), which correspond to a calculation of an output vector c=A·b. Now, it is relevant to optimize devices performing computing operations with such matrices, in particular when concerning very large matrices comprising, for example, millions of non-zero values.

There exist storage formats for sparse matrices which avoid storing all the zeroes of these matrices. These formats correspond for example to the CSR (Compressed Sparse Row) and CSC (Compressed Sparse Column) format. These formats enable to decrease the size of the memory required for their storage. On the other hand, they require browsing tables which contain indices, that is, the locations, of non-zero values. Now, memory and cache systems (or cache memories) used in conventional computers are not well adapted to processing irregular memory access sequences which result from the processing of the sparse data of sparse matrices.

There exist various ways of performing an SpMV-type computing, such as for example inner-product or outer-product computing algorithms. Algorithms of "outer-product" type require fewer memory accesses than those of "inner-product" type, but are less widely used because they imply for output vector c to be updated in such a way that $c_i=c_i+A_{i,j}*b_j$, with $c_i$ corresponding to the values of output vector c, $A_{i,j}$ corresponding to the values of sparse matrix A, and $b_j$ corresponding to the values of input vector b. These updates of the values of output vector c involve irregular memory accesses, since the positions of these values depend on those of the non-zero values in sparse matrix A. These updates of the values of output vector c are called "reductions" and consist in adding a partial product ($A_{i,j}*b_j$) to the previous value of vector c. These reductions, performed at non-regular addresses, cause a lot of data traffic towards the main memory, or external memory, and for this reason, algorithms of "inner-product" type are by default the most widely used.

It should be noted that a matrix may be broken down into a plurality of regions, and that each region of a matrix may be processed independently. It is thus possible, on evaluation of a matrix of large size, to have algorithms of "inner-product" and "outer-product" type coexist.

In many application fields, such as that of the solving of differential equations, the sparse matrices which are processed very often have non-zero elements located relatively densely around the matrix diagonal, this distribution of the non-zero elements becoming sparse around the matrix diagonal. Further, sparse matrices which do not have this so-called "band" structure, in which the non-zero values are predominantly located in the region of the matrix diagonal, may be transformed into a matrix comprising a diagonal dense in terms of non-zero values, with a reasonable computational cost.

US document 2018/189239 A1 describes a hardware acceleration architecture for the implementation of computing operations on sparse matrices. In this architecture, the matrix subjected to operations can be decomposed into two regions, one of these regions being denser in non-zero values than the other region. These two regions are processed by separate computing units and memories. In this architecture, the system is highly parallelized, with a physical separation of transfers between sparse and very sparse data. Further, the decomposition of the matrix for the different regions requires a preprocessing thereof.

SUMMARY

There is a need to provide a computing device optimized for the implementation of outer-product computing algorithms with a decreased number of accesses to the main memory, or outer memory, of the device.

An embodiment overcomes all or part of the disadvantages of existing solutions and provides a computing device, comprising at least:

- a computing unit;
- a main memory;
- a cache memory configured to exchange data with the computing unit and with the main memory, and comprising a computing circuit configured to perform reduction operations between partial products derived from values of at least one sparse matrix and of at least one input vector, and at least one output vector; wherein the cache memory comprises at least a first N-way set associative memory region configured to store, with a first word granularity $T_D$, values of results of reduction operations performed by the computing circuit based on partial products derived from values of at least one dense region of the sparse matrix, and at least one second fully associative or M-way set associative memory region configured to store, with a second word granularity $T_S$, values of results of reduction operations performed by the computing circuit based on partial products derived from values of at least one sparse region of the sparse matrix, with M, N, $T_D$, and $T_S$ corresponding to integers such that M≥N, $T_D$≥$T_S$, and also such that M≥N if $T_D=T_S$ and such that $T_D>T_S$ if M=N.

According to a specific embodiment, the cache memory comprises an interface coupled to the computing unit and configured to receive reduction operations requested by the computing unit and intended to be implemented by the computing circuit, and to send corresponding data into the first memory region when the partial products of the reduction operations are derived from values of the dense region of the sparse matrix, or into the second memory region when the partial products of the reduction operations are derived from values of the sparse region of the sparse matrix.

According to a specific embodiment, the main memory and the cache memory are configured in such a way that exchanges between the main memory and the first memory region correspond to read and write operations, and/or exchanges between the main memory and the second memory region correspond to RMW-type atomic operations.

According to a specific embodiment, the cache memory further comprises at least a third set-associative memory region configured to store data sent from the main memory.

According to a specific embodiment, the cache memory further comprises at least one FIFO memory region configured to temporarily store data sent from the second memory region to the main memory.

According to a specific embodiment, the second memory region is configured in such a way that if the implementation of a reduction operation by the computing circuit involves an eviction of data stored in the second memory region, said reduction operation is implemented in the main memory or in another cache memory interposed between the cache memory and the main memory.

According to a specific embodiment, the cache memory is configured to implement, on reception of a reduction operation requested by the computing unit and the result of which involves a modification of a result value:

- search for the presence of the result value in the first memory region;
- update of the result value in the first memory region if this value is present in the first memory region, or sending of the reduction operation requested by the computing unit to the first memory region or the second memory region if this value is absent from the first memory region.

According to a specific embodiment, the first memory region is configured in such a way that each line of values stored in the first memory region comprises at least an address field, a line state field, and a plurality of value fields, and/or the second memory region is configured in such a way that each portion of the second memory region intended to store a value comprises at least one bit representative of the state of said portion.

According to a specific embodiment, the first memory region is configured to implement, during reduction operations performed by the computing circuit based on values of the dense region of the sparse matrix:

- allocation of a line of zero values of the first memory region upon access to an address absent from the cache memory;
- writing of results of said reduction operations into said line of the first memory region;
- when said line of the first memory region is selected to be evicted, reading of values stored in the main memory and combination, in said line of the first memory region, of the values read from the main memory with those written into said line of the first memory region;
- eviction of said line from the first memory region, comprising a writing of the values of said line of the first memory region into the main memory.

According to a specific embodiment, the cache memory is configured in such a way that when the density of non-zero values of a portion of the sparse region of the sparse matrix is greater than a first threshold value, results of reduction operations implemented based on the values of said portion of the sparse region of the sparse matrix are stored in the first memory region.

According to a specific embodiment, the second memory region is configured to implement an eviction of at least one of the values stored in the second memory region towards the main memory when the number of values stored in the second memory region exceeds a predefined storage capacity threshold.

According to a specific embodiment, the cache memory further comprises an interface block configured to determine the size of each of the exchanges from and to the main memory, and a circuit for implementing a leaky bucket type algorithm delivering at least one variable representative of a bandwidth of access to the main memory.

According to a specific embodiment, the first memory region is configured to synchronize sendings of read requests to the main memory as a function of a value of the variable representative of the bandwidth of access to the main memory, and/or the second memory region and the interface block are configured to implement evictions of values stored in the second memory region to the main memory as a function of a number of values stored in the second memory region and of a value of the variable representative of the bandwidth of access to the main memory.

According to a specific embodiment, the cache memory further comprises a fourth multi-way set associative memory region having a size smaller than that of the first memory region, and a buffer memory block configured to temporarily store values of results of reduction operations performed by the computing circuit based on partial products derived from values of at least a second dense region of the localized sparse matrix and to transfer said values into the second memory region or into the fourth memory region.

According to a specific embodiment, the sizes of the cache memory regions are defined according to characteristics of the sparse matrix.

BRIEF DESCRIPTION OF THE DRAWINGS

The foregoing features and advantages, as well as others, will be described in detail in the rest of the disclosure of specific embodiments given as an illustration and not limitation with reference to the accompanying drawings, in which:

FIG. 3 shows examples of reduction operations sequentially performed in a first memory region of a cache memory of the computing device;

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For clarity, only those steps and elements which are useful to the understanding of the described embodiments have been shown and are described in detail. In particular, various elements (processor, main memory, cache memory, memory controller, data transmission bus, etc.) of the computing device are not detailed. Those skilled in the art will be capable of designing these elements in detail based on the functional description given herein.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, where reference is made to absolute position qualifiers, such as "front", "back", "top", "bottom", "left", "right", etc., or relative position qualifiers, such as "top", "bottom", "upper", "lower", etc., or orientation qualifiers, such as "horizontal", "vertical", etc., reference is made unless otherwise specified to the orientation of the drawings in a normal position of use.

Unless specified otherwise, the expressions "about", "approximately", "substantially", and "in the order of" signify plus or minus 10%, preferably of plus or minus 5%.

Throughout the document, the term "vector" is used to designate a row matrix or column matrix.

Figure 1:
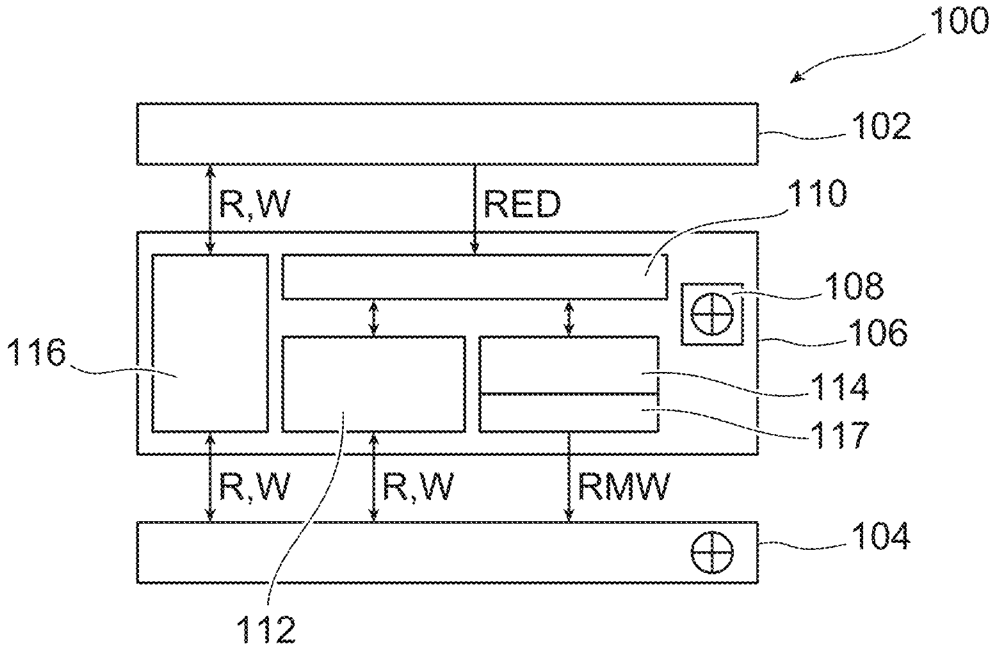
FIG. 1 schematically shows a computing device according to a first embodiment.

An example of a computing device 100 according to a first embodiment is described hereafter in relation with FIG. 1. In the described example, device 100 is configured to implement algorithms of multiplication of a sparse matrix A with an input vector b (operation SpMV calculating the output vector c=A·b). According to an example, the calculated data may be floating-point numbers, typically stored in double format, and the operation implemented for the reduction by cache memory 106 may correspond to an addition. As a variant or additionally, device 100 may be configured to implement "SpMSpM"-type operations, which each corresponds to a computing of an output matrix C=A·B, A and B corresponding to two sparse matrices, and which can be seen as a sequence of a plurality of consecutive SpMV operations.

Device 100 comprises a computing unit 102, which for example corresponds to a processor or any other circuit adapted to the implementation of the algorithms intended to be executed.

Device 100 also comprises a main memory, or external memory, 104, for example, of RAM (Random Access Memory) type and typically a DRAM (Dynamic Random Access Memory).

Sparse matrix A and input vector b are here stored in main memory 104. Sparse matrix A may be stored in a format adapted to the implementation of an outer-product computing algorithm, for example, a CSC format.

Device 100 also comprises a cache memory 106 having computing unit 102 and main memory 104 coupled thereto. Cache memory 106 is configured to exchange data with computing unit 102 and with main memory 104, and more specifically with a memory controller of main memory 104.

Cache memory 106 comprises a computing circuit 108 configured to perform additive-type reduction operations between partial products and values of output vector c. Each of the partial products corresponds to an operation performed by computing unit 102 between one of the values of sparse matrix A and one of the values of input vector b. For example, computing circuit 108 may perform a reduction corresponding to an addition between a value $c_i$ of output vector c and a partial product $A_{i,j}*b_j$ ($A_{i,j}$ corresponding to one of the values of sparse matrix A and $b_j$ corresponding to one of the values of input vector b) such that $c_i=c_i+A_{i,j}*b_j$. For example, computing unit 108 may correspond to an arithmetic logic unit (ALU). In the described embodiment, computing unit 108 is configured to implement reduction operations on values of an output vector c stored in cache memory 106.

In the example of FIG. 1, cache memory 106 comprises an interface 110 coupled to computing unit 102 and configured to receive operations, corresponding to reductions in the described example, sent by computing unit 102 and intended to be implemented by the computing circuit 108 of cache memory 106.

Cache memory 106 further comprises at least one first N-way set associative memory region 112 configured to store, with a first word granularity $T_D$, values of results of reduction operations performed by computing circuit 108 based on partial products derived from, or calculated from, values of a dense region of sparse matrix A. Cache memory 106 also comprises at least one second fully associative or M-way set associative region 114 configured to store, with a second word granularity $T_S$, values of results of reduction operations performed by computing circuit 108 based on partial products derived from, or calculated from, values of a sparse region of sparse matrix A, with M, N, $T_D$, and $T_S$ corresponding to integers such that M≥N, $T_D \geq T_S$, and also such that M≥N if $T_D=T_S$ and such that $T_D \geq T_S$ if M=N.

A memory region can be considered as having a word granularity T if the size of the smallest transaction of the memory region with an external memory is T words. For example, a cache memory having a granularity corresponding to a line size T=8 may perform writings and readings of at least 8 words. The granularity can be seen as corresponding to the number of consecutive elements stored in cache (cache line).

The first memory region 112 of cache memory 106 is optimized to process reduction operations performed with partial products derived from values of the dense region of sparse matrix A and is organized as a set-associative cache in which complete cache lines, for example of 64 bytes (that is, 8 values, or 8 words, when these values are stored in a dual format and the first memory region 112 is 4-way set associative), are stored at each writing.

According to an embodiment, the first memory region 112 may be configured to implement, during reduction operations performed by computing circuit 108 based on partial products derived from values of a dense region of sparse matrix A, the following steps:

- allocation of a line of zero values of first memory region 112 upon access to an address which is not present yet in cache memory 106;
- writing of results of said reduction operations into said line of first memory region 112;
- when said line of first memory region 112 is selected to be evicted, reading of values stored in main memory 104 and combination, in said line of the first memory region 112, of the values read from main memory 104 with those written into said line of first memory region 112;
- eviction of said line from first memory region 112, comprising a writing of the values of said line of first memory region 112 into main memory 104.

Cache memory 106 may be configured, to avoid or decrease blockings due to evictions of lines of cache memory 106, to anticipate readings from main memory 104, and thus balance the data traffic from and to main memory 104 and avoid situations of blocking of the data traffic from/to main memory 104. Examples of implementation of features allowing these anticipations are described hereafter.

The second memory region 114 of cache memory 106 is optimized to process reduction operations performed with partial products derived from values of the sparse regions of sparse matrix A and is for example organized as a fully associative cache individually storing a value (for example, in double format, that is, 8 bytes) at each writing, rather than complete cache lines as done by first memory region 112. Indeed, since the data are not denser in sparse regions of sparse matrix A, it makes no sense to manage, in read and write mode, entire cache lines, given that most of the cells of the lines would be empty (given the predominant presence of zero values in the sparse regions of sparse matrix A). Data management on a smaller scale than entire cache lines is thus advantageous when reduction operations are implemented based on partial products derived from values of the sparse regions of sparse matrix A. Such an advantage can also be found when second memory region 114 forms an M-way set associative cache, with M≥N, that is, in which the data management is performed at the scale of smaller cache lines than those processed in first memory region 112, or when the two memory regions 112, 114 are configured to operate with different word granularities.

In the described example, interface 110 is configured to receive the reduction operations to be performed sent by computing unit 102 (symbolized by the expression "RED" in FIG. 1) and, depending on the location of the concerned data in sparse matrix A (dense or sparse region), send the data to first memory region 112 or second memory region 114. The destination region may correspond to a parameter of each reduction operation to be performed.

For example, considering i and j corresponding to the indices of the lines and columns of sparse matrix A, and B corresponding to the band width of the dense region, this dense region is that for which the values $A_{i,j}$ are such that $|i-j|<B$, the other values belonging to the sparse region of sparse matrix A. The value of B can be determined as a function of the size of the cache lines of the first memory region 112, or as a function of a density difference between the dense and sparse regions of sparse matrix A.

Further, in the described example, exchanges between first memory region 112 and main memory 104 correspond to operations of reading from and writing into entire cache lines (symbolized by the expression "R, W" in FIG. 1). Further, the exchanges performed between second memory region 114 and the main memory may correspond to atomic "Read-Modify-Write", or RMW, operations.

In the embodiment of FIG. 1, cache memory 106 also comprises a third cache memory region 116 operating as a standard cache memory, that is, configured to store data sent from main memory 104 and write operations originating from computing unit 102. This third memory region 116 may be used as a cache during memory accesses which do not concern the computing of output vector c, including the reading of data from sparse matrix A or input vector b, and thus decrease the access latency from computing unit 102 to data of sparse matrix A or of input vector b stored in main memory 104. The third region 116 may operate as a set associative cache in which complete cache lines are stored at each write and read operation. Unlike the first and second regions 112, 114, the third region 116 is not configured to be able to implement reduction operations on output vector c. Further, in the described example, the exchanges performed between third memory region 116 and main memory 104 may correspond to operations of reading from and writing into entire cache lines.

In the example of embodiment of FIG. 1, cache memory 106 also comprises a FIFO memory region 117 configured to operate with second memory region 114 and the main memory on implementation of RMW atomic operations, the data corresponding to these operations being temporarily stored in FIFO memory region 117 to avoid possible congestion problems in main memory 104 and avoid case of blocking of cache memory 106.

Figure 2:
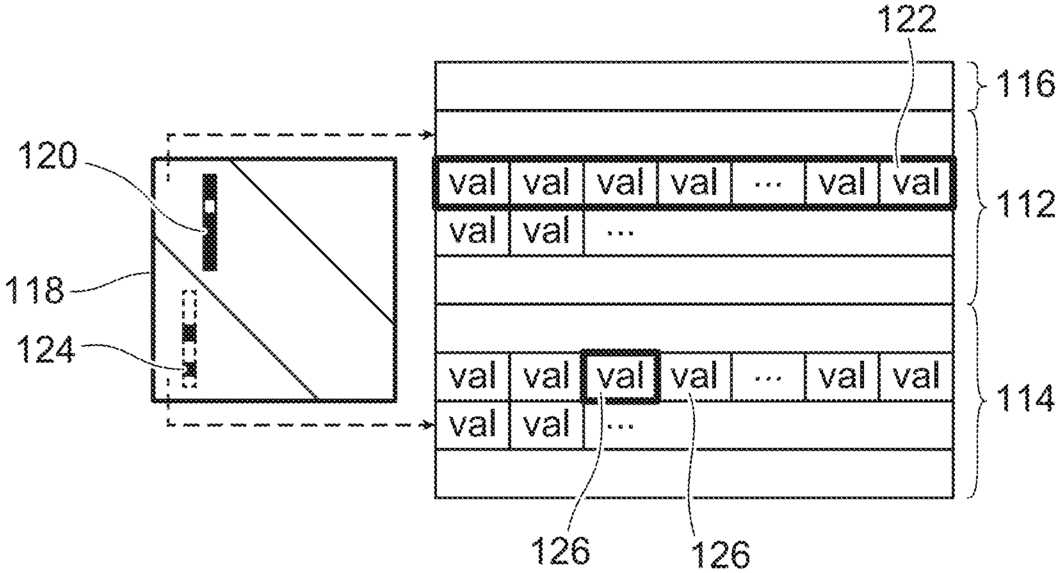
FIG. 2 schematically shows an association performed between different regions of a sparse matrix used in computing implemented by the computing device and different regions of the cache memory of the computing device.

FIG. 2 schematically shows the association performed between different regions of sparse matrix A processed in computing and different regions of cache memory 106. In this drawing, sparse matrix A (symbolically shown) is designated by reference 118. Reference 120 designates data forming part of the dense region of sparse matrix A, that is, located in the region of the diagonal of sparse matrix A, and which are subjected to an operation having its result written into a line 122 of first memory region 112. Reference 124 designates data forming part of the sparse region of sparse matrix A and which are subjected to an operation having its result written in the form of individual words 126 into second memory region 114. In FIG. 2, the value of each word is symbolically represented by a box "val". In the example of FIG. 2, the granularity of first memory region 112 is one word line (symbolically surrounded by a bold line) and that of the second memory region 114 is a single word (symbolically surrounded by a bold line).

Cache memory 106 is configured to store at least part of the values of the output vector c resulting from the implementation of the operation performed between sparse matrix A and an input vector b. During an SpMV operation, matrix A is scanned and the values of output vector c are updated by the reductions performed. Cache memory 106 is here adapted for this operation to be implemented by an algorithm of "outer-product" type.

The reduction operations performed based on the values present in the dense region(s) of sparse matrix A generate non-zero values of output vector c which are close to one another. The first memory region 112 of cache memory 106 is well suited to processing operations performed on this dense region of sparse matrix A, by implementing the reduction operations on the values of this region, as it makes sense in this case to work with entire cache lines. On the other hand, the operations performed on the values present in the sparse region(s) of sparse matrix A are advantageously processed, in the second memory region 114, individually and not on the scale of complete cache lines.

In an example of embodiment, this distribution of the processing of operations according to the location in the dense and sparse regions of sparse matrix A of the data used, between the first and second memory regions 112, 114 of cache memory 106, may be adapted according to the results of the performed operations. Thus, when the density of non-zero values of a portion of the sparse region of sparse matrix A exceeds a certain threshold value that can be arbitrarily selected (for example, in the presence of at least 3 non-zero values in a cache line of 8 values), results of operations implemented from the values of said portion of the sparse region of sparse matrix A may be stored in entire cache lines in first memory region 112 and not individually in second memory region 114. For example, if a word line in first memory region 112 is sparsely filled at the time of an eviction, it is possible to displace the writing of the computing results initially provided in first memory region 112 to FIFO memory region 117, to be subsequently evicted by the implementation of RMW-type atomic operations. This avoids having to bring a line of main memory 104 into first memory region 112 to write a small number of non-zero values.

Each line of values of first memory region 112 may also comprise a field, for example called "tag", corresponding to the address of the corresponding line of values in main memory 104. Such a field may enable to determine whether the line of values is already present in first memory region 112 ("hit" of this line) or whether it is absent from the first memory region 112 ("miss" of this line).

In cache memory 106, on reception of a reduction operation requested by computing unit 102 and received by cache memory 106, the value to be updated can be searched for in first memory region 112. If this value is present in first memory region 112 ("hit" of this value), the value can be accumulated in first memory region 112. If this value is absent from first memory region 112 ("miss" of this value), the reduction to be carried out is sent into first or second memory region 112, 114, depending on the location in sparse matrix A of the data item which has enabled to obtain this intermediate result.

According to a specific embodiment, in first memory region 112, each line of values, or cache line, may comprise a field, for example called "state", indicating the state of the line of values, which state may correspond to one of the following four possible states:

NOV: Invalid state, indicating a free cache line;

VNU: Valid but not updated state, indicating that the values of the cache line are not consistent with those present in main memory 104;

VIP: Valid state but update in progress, indicating that the values of the cache line are not consistent with those of main memory 104 but that the update of this cache line is in progress;

VUP: Valid and up-to-date state, indicating that the values of the cache line are consistent with those of main memory 104 (which means that during a write operation (eviction), the cache line could overwrite the line in main memory 104 with no loss of data).

According to an example of embodiment, in an initial state, all the lines of first memory region 112 are in state NOV. As soon as a line is allocated, as a result of a requested reduction, the values of this line are set to zero, after which the value of the reduction is stored at the correct location within this line. At this stage, the content of the line contains this new update, but is not consistent with the content of main memory 104. The line is then at the VNU state. Cache memory 106 may be configured to then search for the corresponding values of the line in main memory 104 to make the line consistent. When the request for reading from main memory 104 is sent, the line switches from the VNU state to the VIP state. When the read data are sent from main memory 104 to first memory region 112, the content of the line of first memory region 112 is updated by accumulating the line of first memory region 112 with the corresponding line of main memory 104, and the line switches to the VUP state.

When a line is at the VUP state, it can be evicted, and the eviction can be achieved by commanding a writing of the concerned line into main memory 104. Such an eviction is not blocking for cache memory 106, since as soon as the writing of the line to be evicted is sent to main memory 104, the concerned line in first memory region 112 can be reused for another address. Further, given that the eviction can be carried out quickly, computing unit 102 is not blocked while waiting for the line to be freed in cache memory 106. An appropriate management of the state of the lines of values in first memory region 112 may be to switch them to the VUP state as soon as possible.

FIG. 3 shows examples of reduction operations carried out in lines of values of first memory region 112. These reduction operations are implemented sequentially in time, from configuration a) to configuration i). These examples enable to illustrate the possibilities of state transition of the lines of values according to the behaviors of first memory region 112 ("hit", "miss", and "miss and eviction"). For each of these configurations, the reduction operation performed is indicated in FIG. 3 in the form "RED address value".

Configuration a) represents the initial state of first memory region 112 which, in this example, forms a 2-set, 2-way cache (that is, 2 lines of values per set, for a total of 4 lines of values), each line of values having a size of 2 words. Each line of values has a field "tag", which enables to find out the address of the corresponding line in main memory 104 and thus determine whether the requested line of values is already present or not in first memory region 112. Further, each line of values comprises a field "state" indicating the state of the line (corresponding to one of the previously-described four "NOV", "VNU", "VIP", and "VUP" states). For each of configurations b) to i), the performed reduction operation is indicated above the table of cache line values.

In configuration b), the data item concerned by the performed reduction operation (at address "0x18" in this example) is present in first memory region 112 ("hit") and there is no need to allocate a new line or to perform an eviction. The data item is simply accumulated with that present in the concerned line (value "2" changes to value "7") and the "VUP" state of this line is not modified.

In configuration c), the data item concerned by the performed reduction operation is present in first memory region 112 ("hit"), and here again, there is no need to allocate a new line or to perform an eviction. The data item is simply accumulated with that present in the concerned line (value "3" changes to value "6") and the "VIP" state of this line is not modified.

In configuration d), a "miss" occurs given that no value of field "tag" corresponds to the address of the reduction operation. The only line in the "NOV" state is allocated for this operation, and the value of the reduction operation is inserted therein. The state of the line of modified values changes from "NOV" to "VNU". This case is not blocking for subsequent operations.

Configuration e) is similar to configuration d) (occurrence of a "miss"), but with the difference that no line of first memory region 112 is free, that is, at the "NOV" state. An eviction of one of the lines of the first memory region 112 is performed. Since one of them is in the "VUP" state, it is selected in priority for this eviction, and a writing of this line into main memory 104 (written in the form "WRITE address value" in FIG. 3) is carried out before the writing into first memory region 112. This operation is not blocking for subsequent operations. The line written into first memory region 112 is set to the "VNU" state.

Configuration f) is similar to configuration e), but this time, a line in the VNU state which contains few elements is selected. The eviction is performed with the implementation RMW-type atomic operations on individual elements of the line, and not on the entire line. This operation is not blocking, since it only occurs when the FIFO memory region 117 processing RMW-type operations is not full.

Configuration g) corresponds to the occurrence of a "miss". In the absence of a line in the "VUP" state, one of the lines in the "VIP" state is selected for the implementation of an eviction. In this configuration, an operation of reading from main memory for the line concerned by the eviction is in progress. Thus, before performing the writing into first memory region 112, cache memory 106 is for example configured to wait for the response to this read operation, then to perform the reduction operation and then the operation of writing into main memory 104. This operation corresponds to a blocking case due to the fact that cache memory 106 has to wait for the end of the eviction before performing its write operation.

In configuration h), the data item concerned by the reduction operation is present in first memory region 112 ("hit"), and there is no need to allocate a new line or to perform an eviction. The data item is simply accumulated with that present in the concerned line, and the "VNU" state of this line is not modified.

Configuration i) corresponds to the occurrence of a "miss". In the absence of a line at the "VUP" or "VIP" state, one of the lines at the "VNU" state is selected for the implementation of an eviction. In this configuration, an operation of reading from the main memory for the line concerned by the eviction is thus initiated. The reduction operation and the operation of writing into main memory 104 are then implemented. This operation corresponds to a blocking case due to the fact that cache memory 106 has to initiate and wait for the end of the eviction before performing its write operation.

The structure of second memory region 114 is similar to that of a table of values, for example of 8 bytes each, which may be fully associative, that is, each value of which can be accessed individually. A CAM (Content-Addressable Memory) is a possible way of carrying out a search in such a memory structure. Each portion of the second memory region 114 intended to store a value may comprise a state bit called "dirty bit" and enabling to know whether or not this portion is free, and may have the capacity to perform "hit", "miss", and "miss and eviction" like first memory region 112. To communicate with main memory 104, second memory region 114 may implement only RMW-type atomic operations on a value and its address. During an eviction, the value and the address are sent to FIFO memory region 117, which initiates as soon as possible the atomic RMW operations.

Figure 4:
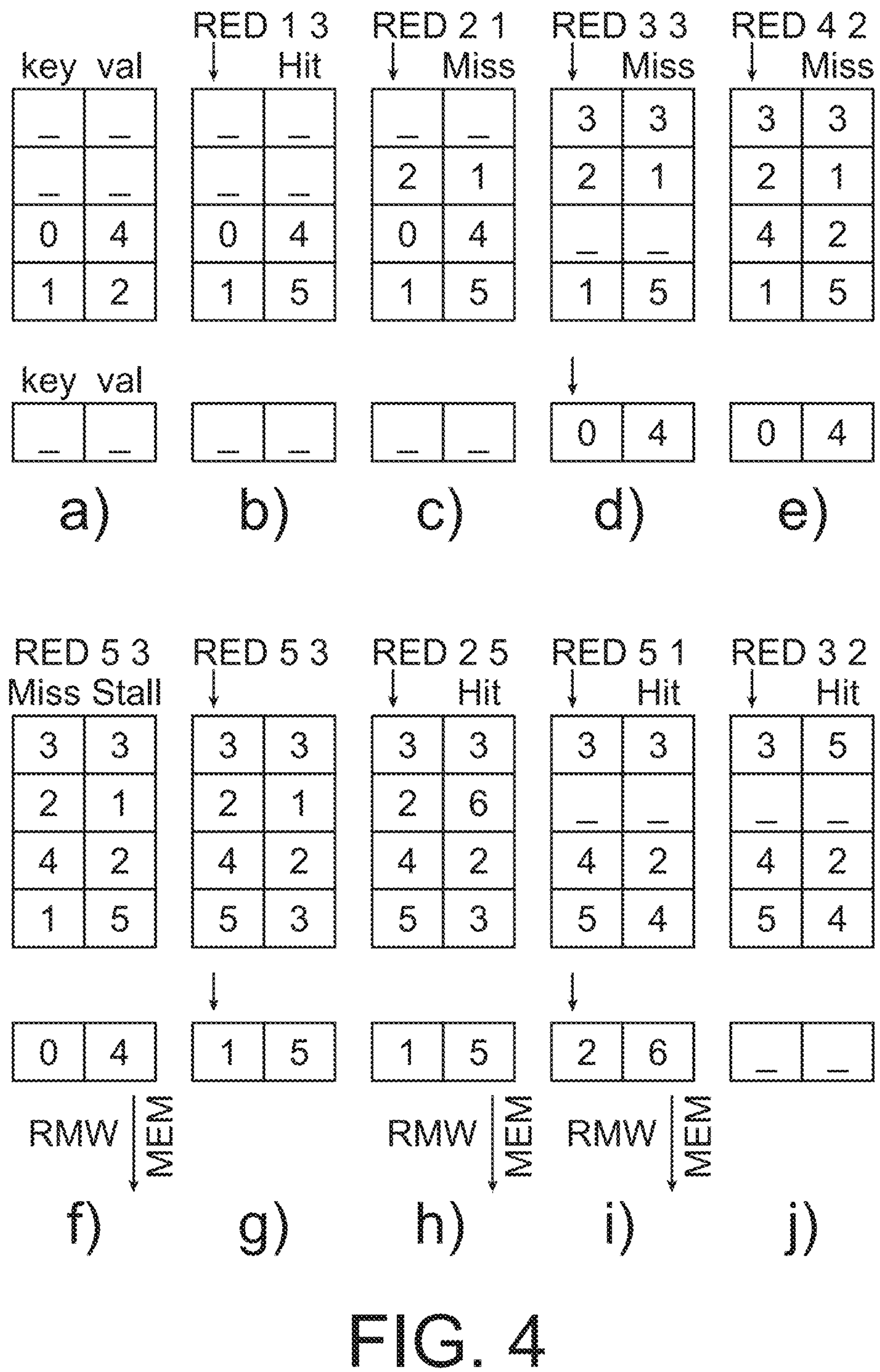
FIG. 4 shows examples of reduction operations sequentially performed in a second memory region of a cache memory of the computing device.

FIG. 4 shows examples of reduction operations performed in second memory region 114. These reduction operations are implemented sequentially in time, from configuration a) to configuration j). These examples enable to illustrate the possibilities of state transition of the different values as a function of the behaviors of the second memory region 114 ("hit", "miss", and "miss and eviction"). For each of these configurations, the performed reduction operation is indicated in FIG. 3 in the form "RED address value".

Configuration a) shows the initial state of second memory region 114, which in this example forms a 4-word cache. A key/address field ("key" in FIG. 4) is associated with each word. Further, in this example, second memory region 114 is associated with FIFO memory region 117, which has a 1-word size and which is shown below second memory region 114. A storage capacity threshold called $\alpha_{region114\_full}$ from which second memory region 114 is considered as too full to implement a reduction operation is, for example, selected to be equal to 3.

Configuration b) corresponds to a reduction operation where a "hit" occurs, the received value being accumulated in second memory region 114 without calling on FIFO memory region 117.

Configuration c) corresponds to a reduction operation where a "miss" occurs when second memory region 114 is not considered as being too full (quantity of stored values not exceeding the value of the storage capacity threshold), the received value then being inserted into a free portion of second memory region 114.

Configuration d) corresponds to a reduction operation where a "miss" occurs and where second memory region 114 becomes too full (nb stored values>$\alpha_{region114\_full}$). An early eviction is thus performed to keep the filling of second memory region 114 below the value of threshold $\alpha_{region114\_full}$. FIFO memory region 117 receives the value to be evicted.

Configuration e) corresponds to a reduction operation where a "miss" occurs. The received value is written into second memory region 114 without performing an eviction, since FIFO memory region 117 is full.

Configurations f) and g) illustrate blocking cases where second memory region 114 needs to wait (corresponding to the indication "Miss Stall" in FIG. 4) for FIFO memory region 117 to empty, for example, of at least one value (operation symbolized by the indication "RMW MEM" in FIG. 4), to perform the new reduction which has just occurred.

Finally, configurations h), i), and j) illustrate situations where "hits" occur, enabling to restore the quantity of values stored in second memory region 114 below the filling threshold $\alpha_{region114\_full}$ via the implementation of an eviction of values stored in second memory region 114 and the transfer of the value stored in FIFO memory region 117 to main memory 104.

The example described in relation with FIG. 4 illustrates the advantage of anticipating the evictions to be carried out from second memory region 114 when it fills up, to avoid the occurrence of blocking cases, due to the use of storage capacity threshold $\alpha_{region114\_full}$.

Another aspect of device 100 concerns the management of the congestion of accesses to main memory 104. Indeed, during the operation of device 100, accesses to main memory 104 are not evenly distributed over time, and there are times when main memory 104 is little used, and others when the number of accesses to main memory 104 is very high.

Figure 5:
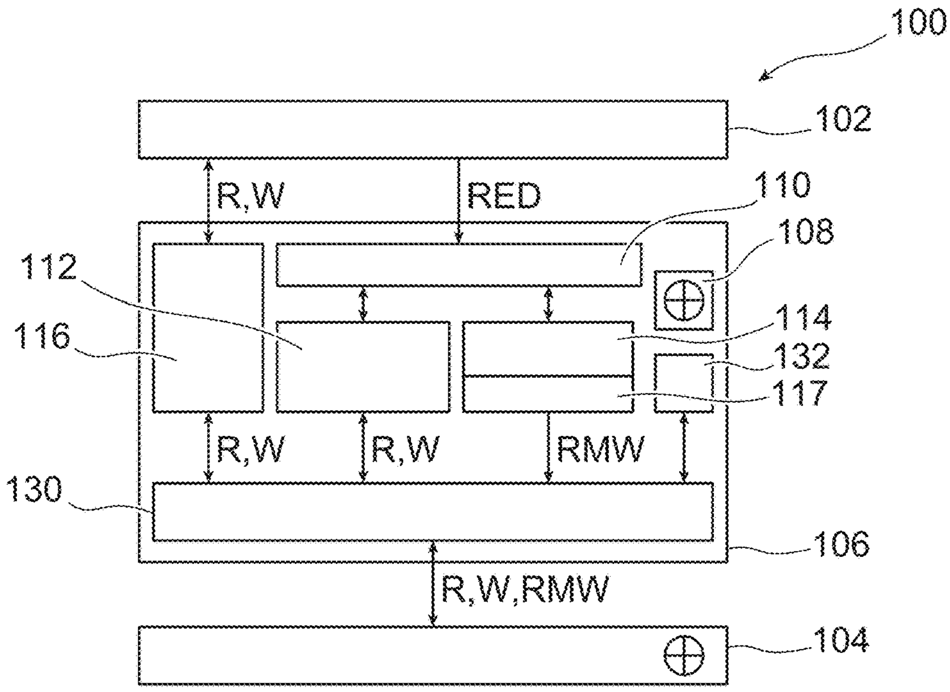
FIG. 5 schematically shows a computing device according to a second embodiment.

To enable a management of the congestion of main memory 104, the device 100 according to a second embodiment and shown, for example, in FIG. 5 may comprise a cache memory 106 provided with an interface block 130 configured to determine the size (for example, in bytes) of each of the exchanges to and from main memory 104. In addition, to determine the load state of main memory 104, interface block 130 is coupled to a circuit 132 implementing a leaky-bucket type algorithm. At each time unit, for example at each clock stroke, circuit 132 can receive a token which corresponds to the memory bandwidth actually available between cache memory 106 and main memory 104. For example, if the memory interface has a bandwidth of 100 Gbit/see and the clock period is 1 ns, then, at each clock stroke, circuit 132 can receive a token which corresponds to 100 bits.

Each time cache memory 106 sends or receives a data item to or from main memory 104, from or to any memory region 112, 114 or 116, the number of bits which corresponds to this memory access can be counted by circuit 132. Circuit 132 may also have a maximum fill level, and the number of tokens is capped at this value. Due to the state of circuit 132, the controllers of each of memory regions 112, 114, and 116 may know whether there is available memory bandwidth. Thus, memory regions 112, 114 may be configured to anticipate their accesses and send them at the right time, that is, when main memory 104 is under little load, and thus avoid creating congestion in main memory 104.

Other variants of interface block 130 and/or of circuit 132 enabling to limit congestion of accesses from/to main memory 104 are possible.

According to a specific embodiment, cache memory 106 may be configured to define, when a line in first memory region 112 is updated, a time at which a request for reading from main memory 104 is sent. Indeed, in first memory region 112, the switching of a line from the "VNU" state to the "VIP" state involves the sending of a read request to main memory 104. A contribution to the optimization of accesses to main memory 104 may be to choose when to perform this reading. It may be initiated as soon as the cache line passes from the "NOV" state to the "VNU" state, or later when the line has to be evicted from first memory region 112. By selecting the times at which read operations are initiated to switch from the "VNU" state to the "VIP" state of the lines of first memory region 112, according to the state of circuit 132, it is possible to carry out these readings at the right time, that is, when main memory 104 is not overloaded. In this configuration, first memory region 112 is thus configured to synchronize sendings of read requests to main memory 104 as a function of a value of the variable representative of the bandwidth of access to main memory 104. Thus, cache memory 106 can limit simultaneous memory accesses, and decrease the average latency of access to main memory 104.

Alternatively or complementarily to the above configuration, it is possible for second memory region 114 and interface block 130 to be configured in such a way as to perform accesses to main memory 104 according to the state of circuit 132. For example, when second memory region 114 is not very full, for example with a number of stored values below a threshold $\alpha_{region114}$, interface block 130 and second memory region 114 can be configured in such a way that they do not initiate a request to access main memory 104. When second memory region 114 starts getting a little fuller, for example with a number of stored values between threshold $\alpha_{region114}$ and the previously-described storage capacity threshold $\alpha_{region114\_full}$, second memory region 114, and interface block 130 can be configured to implement evictions of data stored in second memory region 114, provided for main memory 104 not to be overloaded, that is, according to the state of circuit 132. Evictions may be triggered by interface block 130. If second memory region 114 is almost full, for example with a number of stored values above storage capacity threshold $\alpha_{region114\_full}$, second memory region 114 performs data evictions towards main memory 104, unless FIFO memory region 117 is already full, as previously described. This progressive thresholds system, which also takes into account the load of main memory 104 via the state of circuit 132, enables to prevent a congestion of main memory 104 which would be due to second memory region 114.

Updates to the data stored in second memory region 114 bear on memory addresses which are spatially isolated from one another. It is thus not efficient, in this second memory region 114, to bring in an entire cache line from main memory 104 to update a single word. Thus, in a specific configuration of device 100, these updates may be displaced to a cache controller closer to main memory 104, for example into an L2 or L3 cache memory when cache memory 106 forms an L1 cache memory, or displaced into main memory 104. In other words, second memory region 114 can be configured in such a way that if the implementation of an operation by computing circuit 108 involves an eviction of data stored in second memory region 114, said operation is implemented in main memory 104 or in another cache memory interposed between cache memory 106 and main memory 104. Such a configuration avoids having to bring a cache line from main memory 104 into cache memory 106 to modify a single value, for example a single word. This configuration enables to decrease data traffic between main memory 104 and cache memory 106, also avoids having cache lines which have a low density, and also enables to take advantage of the access granularity of main memory 104, which is often smaller than a cache line. It is in particular possible to find a balance in such a displacement of data update operations so as not to saturate the computing power of the memory element into which the updates are displaced.

Figure 6:
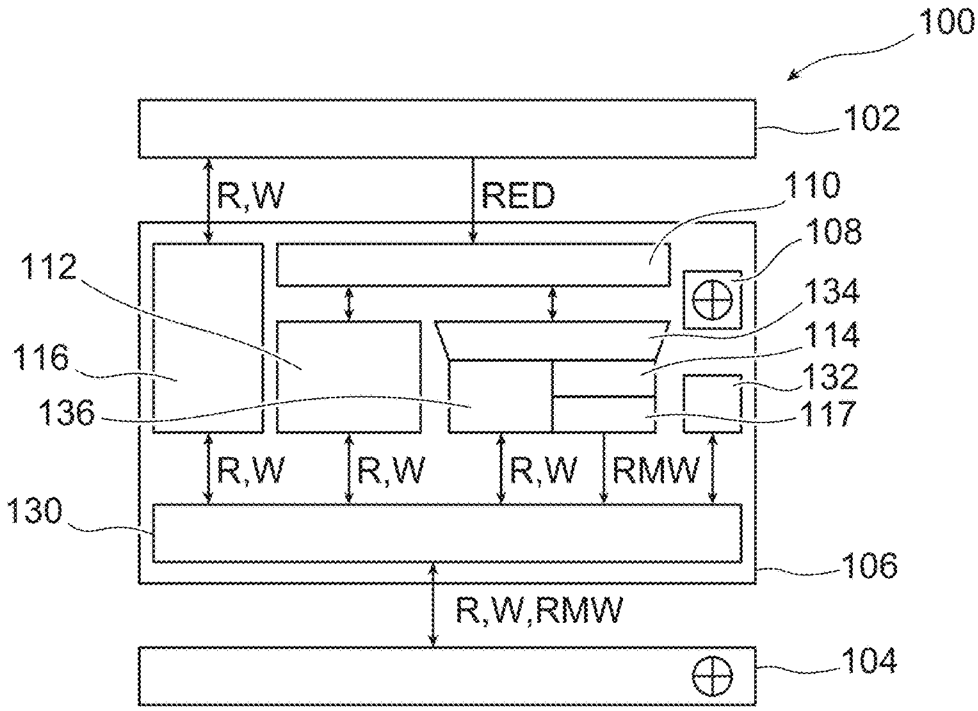
FIG. 6 schematically shows a computing device according to a third embodiment.

FIG. 6 schematically shows device 100 according to a third embodiment.

For first memory region 112 to be efficient, it is preferable for the region of output vector c which is stored in this first memory region 112 not to exceed the height of the band of sparse matrix A corresponding to the dense region of this matrix (considering a band height such as shown in FIG. 2). If the region of output vector c stored in first memory region 112 exceeds this size, during the scanning of a column of sparse matrix A, all the data of first memory region 112 could be evicted, which would not enable to decrease accesses to main memory 104. However, the size, or the memory capacity, of first memory region 112 is limited. Thus, if the width of the matrix band corresponding to the dense region is too large, this constraint cannot be respected. The device 100 according to the third embodiment provides defining the width of the band, and thus defining the limits between the dense and sparse regions of the sparse matrix, as a function of the size of first memory region 112, in order to respect this constraint (this configuration also being implementable for the previously-described embodiments). It is thus possible for portions of the dense region(s) of sparse matrix A, which are not taken into account by first memory region 112, to remain.

This problem can be at least partially solved by providing cache memory 106 with a buffer block 134 called "coalescing buffer", or CB, which corresponds to a buffer having a size equal to that of a cache line and having the function of processing reductions that cannot be processed by first memory region 112. If consecutive reductions fall in a same line of values, buffer 134 merges them. Then, when there arrives a reduction having an address which is not that of the line of values stored in buffer block 134, the line of values stored in buffer block 134 is transferred either to second memory region 114 if it contains few reductions, or to a fourth memory region 136 otherwise. The operation, in terms of associativity, of this fourth memory region 136 is similar to that of first memory region 112 (with, however, a number of ways that may be different), its size, or memory capacity, being however smaller than that of first memory region 112. This fourth memory region 136 is configured to process data from dense regions which are not in the dense main band but between this dense main band and the sparse regions of sparse matrix A. The management of this fourth memory region 136, which has a smaller memory capacity than first memory region 112, requires implementing accesses to main memory 104 to update the line of values and then evict them.

The device 100 according to the third embodiment has the advantage of protecting the data stored in first memory region 112. First memory region 112 enables to always keep in cache the elements of the densest region of the matrix, without for them to be disturbed by other accesses. Further, fourth memory region 136 enables to capture the local spatial locality for dense regions that do not fit into first memory region 112, while protecting it. Since fourth memory region 136 is of small size, when passing from one column to the next, its data will be evicted.

Figure 7:
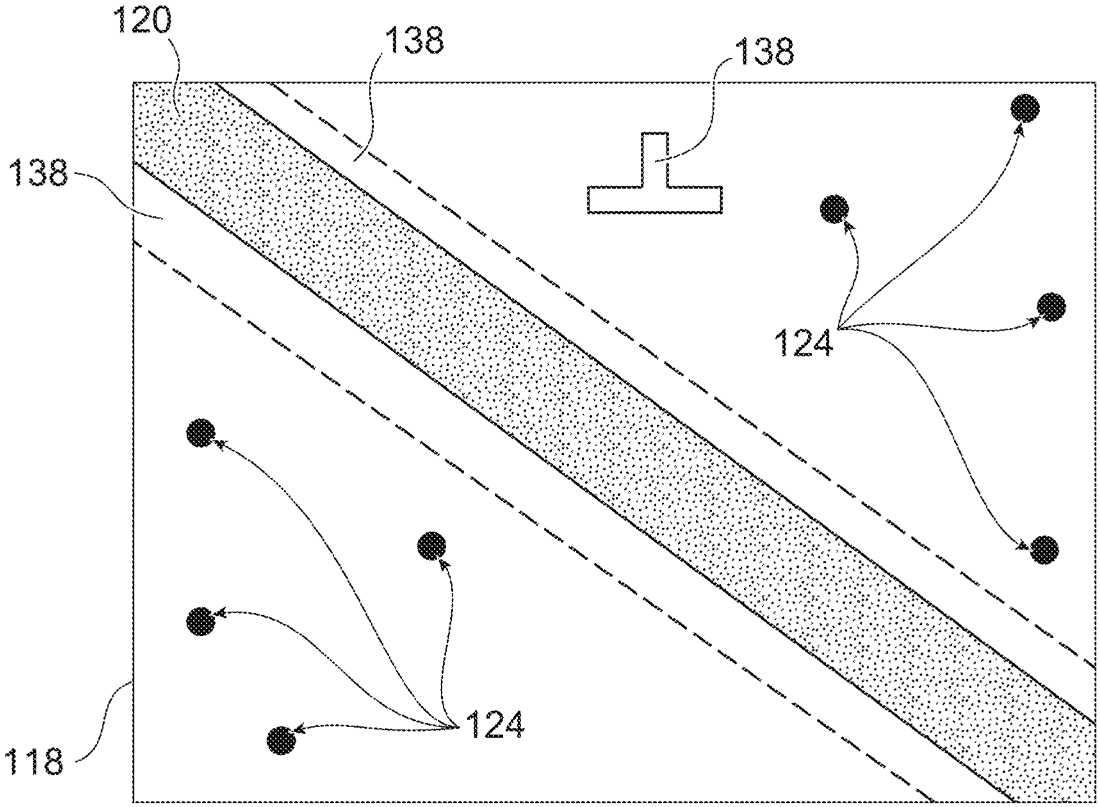
FIG. 7 schematically shows an example of a sparse matrix used in computing implemented by the computing device according to the third embodiment.

FIG. 7 schematically shows the sparse matrix 118 used during computing operations implemented by device 100 according to the third embodiment. As in the first and second embodiments, the data 120 of the dense region of matrix 118 are intended to be processed in the first memory region 112 of cache memory 106, and the data 124 of the sparse regions of matrix 118 are intended to be processed in the second memory region 114 of cache memory 106. Further, reference 138 designates data present in dense regions of matrix 118 located between the dense region for data 120 and the sparse regions of matrix 118, as well as dense data located within the sparse regions of matrix 118.

In the various embodiments, the size, or memory capacity, of the different memory regions of cache memory 106 may depend in particular on the sparse matrix A based on which the computing operations are performed.

According to a first configuration, the sizes of these different regions may be statically defined before initiating the matrix computing operations, and for example calculated by software by analyzing sparse matrix A.

According to a second configuration, the sizes of these different regions may be statically defined and calculated in hardware fashion following previous computing operations implemented based on the same sparse matrix. For example, during a first scanning of sparse matrix A, cache memory 106 may extract statistical parameters from sparse matrix A and then, before launching the next scanning of sparse matrix A, the sizes of the different memory regions of cache memory 106 may be redefined as a function of the previously-extracted statistical parameters.

According to a third configuration, the sizes of the different memory regions of cache memory 106 may be dynamically defined and calculated in hardware fashion. For example, cache memory 106 may analyze, during a matrix computing, the data exchanges carried out by each of the memory regions, and adjust the size of the memory regions on the fly in order to balance the traffic level of the different memory regions of cache memory 106.

Device 100 may comprise a computing unit 102 of single-core or multi-core type. In the case of a multi-core system, device 100 may comprise a plurality of cache memories 106 operating in parallel with one another and coupled to a single main memory 104.

Thus, in all the previously described embodiments and examples, cache memory 106 forms a near-processor data cache (generally referred to as "L1 data cache") which, due to computing circuit 108, enables to perform reductions within cache memory 106 itself, and which is well suited to the access sequence which is typical of the execution of SpMV operations on a sparse matrix with a dense region arranged diagonally across the matrix. Such a configuration of cache memory 106 enables computing unit 102 not to be blocked in a state of waiting for data originating from main memory 104, given that the reduction operations are implemented within cache memory 106 itself. Further, the device 100 thus provided can enable to minimize "miss"-type results during the implementation of reduction operations, and also minimize accesses to main memory 104.

In the various previously-described embodiments, cache memory 106 comprises at least one region optimized to store dense data and at least one other region optimized to store sparse data. Further, cache memory 106 can use the structure of a sparse matrix to send data to the memory region appropriate to the data region. Further, cache memory 106 can move data from the memory region for sparse data to the memory region for dense data, if the density increases, and vice versa. Further, cache memory 106 can contain a plurality of memory regions having their operating rules preventing an address duplication between regions. Further, cache memory 106 can anticipate data evictions so as to avoid a congestion of main memory 104. Further, cache memory 106 can be configured to displace reduction operations as close as possible to main memory 104.

Device 100 enables to use the same computing unit for matrix regions of different densities, and cache memory 106 is adapted to the type of data processed.

Further, the cache memory 106 thus provided can allow an acceleration of the processing of sparse matrices, a reduction in the number of accesses to main memory 104, as well as a better use of the memory system by avoiding bursts of accesses to main memory 104.

In the described examples of embodiment, only cache memory 106 is interposed between computing unit 102 and main memory 104. As an variant to the various previously-described examples of embodiment, device 100 may comprise one or a plurality of other cache memories (L2, L3, etc.) interposed, for example, between cache memory 106 and main memory 104.

In a specific embodiment, cache memory 106 may form a data cache for a generic processor corresponding to computing unit 102, and which enables to accelerate the matrix computing algorithms implemented by the processor. According to another specific embodiment, cache memory 106 may correspond to an element integrated in an accelerator dedicated to calculating SpMV and/or SpMSpM operations by algorithms of "outer-product" type. In the case of an implementation of SpMSpM-type operations, device 100 may be used to accelerate a Gustavson-type algorithm implemented for such operations.

Device 100 may correspond to a high-performance computing device, or HPC.

Various embodiments and variants have been described. Those skilled in the art will understand that certain features of these various embodiments and variants may be combined, and other variants will occur to those skilled in the art.

Finally, the practical implementation of the described embodiments and variants is within the abilities of those skilled in the art based on the functional indications given hereabove.

What is claimed is:

1. Computing device, comprising at least:

a computing unit;

a main memory;

a cache memory configured to exchange data with the computing unit and with the main memory, and comprising a computing circuit configured to perform reduction operations between partial products derived from values of at least one sparse matrix and of at least one input vector, and at least one output vector;

wherein the cache memory comprises at least a first N-way set associative memory region configured to store, with a first word granularity TD, values of results of reduction operations performed by the computing circuit based on partial products derived from values of at least one dense region of the sparse matrix, and at least one second fully associative or M-way set associative memory region configured to store, with a second word granularity TS, values of results of reduction operations performed by the computing circuit based on partial products derived from values of at least one sparse region of the sparse matrix, with M, N, TD, and TS corresponding to integers such that M≥N, TD≥TS, and also such that M>N if TD=TS and such that TD>TS if M=N.

2. Computing device according to claim 1, wherein the cache memory comprises an interface coupled to the computing unit and configured to receive reduction requested by the computing unit and intended to be implemented by the computing circuit, and to send corresponding data into the first memory region when the partial products of the reduction operations are derived from values of the dense region of the sparse matrix, or into the second memory region when the partial products of the reduction operations are derived from values of the sparse region of the sparse matrix.

3. Computing device according to claim 1, wherein the main memory and the cache memory are configured in such a way that exchanges between the main memory and the first memory region correspond to read and write operations, and/or wherein exchanges between the main memory and the second memory region correspond to RMW-type atomic operations.

4. Computing device according to claim 1, wherein the cache memory further comprises at least a third set-associative memory region configured to store data sent from the main memory.

5. Computing device according to claim 1, wherein the cache memory further comprises at least one FIFO memory region configured to temporarily store data sent from the second memory region to the main memory.

6. Computing device according to claim 1, wherein the second memory region is configured in such a way that if the implementation of a reduction operation by the computing circuit involves an eviction of data stored in the second memory region, said reduction operation is implemented in the main memory or in another cache memory interposed between the cache memory and the main memory.

7. Computing device according to claim 1, wherein the cache memory is configured to implement, on reception of a reduction operation requested by the computing unit and the result of which involves a modification of a result value:

search for the presence of the result value in the first memory region;

update of the result value in the first memory region if this value is present in the first memory region, or sending of the reduction operation requested by the computing unit to the first memory region or the second memory region if this value is absent from the first memory region.

8. Computing device according to claim 1, wherein the first memory region is configured in such a way that each line of values stored in the first memory region comprises at least one address field, one line state field, and a plurality of value fields, and/or wherein the second memory region is configured in such a way that each portion of the second memory region intended to store a value comprises at least one bit representative of the state of said portion.

9. Computing device according to claim 1, wherein the first memory region is configured to implement, during reduction operations performed by the computing circuit based on values of the dense region of the sparse matrix:

allocation of a line of zero values of the first memory region upon access to an address absent from the cache memory;

writing of results of said reduction operations into said line of the first memory region;

when said line of the first memory region is selected to be evicted, reading of values stored in the main memory and combination, in said line of the first memory region, of the values read from the main memory with those written into said line of the first memory region;

eviction of said line of the first memory region, comprising a writing of the values of said line of the first memory region into the main memory.

10. Computing device according to claim 1, wherein the cache memory is configured in such a way that when the density of non-zero values of a portion of the sparse region of the sparse matrix is greater than a first threshold value, results of reduction operations implemented based on the values of said portion of the sparse region of the sparse matrix are stored in the first memory region.

11. Computing device according to claim 1, wherein the second memory region is configured to implement an eviction of at least one of the values stored in the second memory region towards the main memory when the number of values stored in the second memory region exceeds a predefined storage capacity threshold.

12. Computing device according to claim 1, wherein the cache memory further comprises an interface block configured to determine the size of each of the exchanges from and to the main memory and a circuit for implementing a leaky-bucket type algorithm delivering at least one variable representative of a bandwidth of access to the main memory.

13. Computing device according to claim 12, wherein the first memory region is configured to synchronize sendings of read requests to the main memory as a function of a value of the variable representative of the bandwidth of access to the main memory, and/or wherein the second memory region and the interface block are configured to implement evictions of values stored in the second memory region to the main memory as a function of a number of values stored in the second memory region and of a value of the variable representative of the bandwidth of access to the main memory.

14. Computing device according to claim 1, wherein the cache memory further comprises a fourth multi-way set associative memory region having a size smaller than that of the first memory region, and a buffer memory block configured to temporarily store values of results of reduction operations performed by the computing circuit based on partial products derived from values of at least a second dense region of the localized sparse matrix and to transfer said values to the second memory region or to the fourth memory region.

15. Computing device according to claim 1, wherein the sizes of the memory regions of the cache memory are defined as a function of characteristics of the sparse matrix.

* * * * *